United States Patent [19]

Hofbauer et al.

[11] Patent Number: 5,307,208
[45] Date of Patent: Apr. 26, 1994

[54] OPTICAL SYSTEM FOR IMAGING THE LIGHT FROM LIGHT SOURCES

[75] Inventors: Engelbert Hofbauer, Pfeffenhausen; Ingrid Schehrer; Jakob Bleicher, both of Munich; Siegfried Hetz, Allershausen; Ulrich Matern, Weilheim, all of Fed. Rep. of Germany

[73] Assignee: Optische Werke G. Rodenstock

[21] Appl. No.: 613,771

[22] PCT Filed: Apr. 12, 1990

[86] PCT No.: PCT/DE90/00285
§ 371 Date: Nov. 19, 1990
§ 102(e) Date: Nov. 19, 1990

[87] PCT Pub. No.: WO90/13054
PCT Pub. Date: Nov. 1, 1990

[30] Foreign Application Priority Data

| Apr. 15, 1989 | [DE] | Fed. Rep. of Germany | 3912496 |
| May 22, 1989 | [DE] | Fed. Rep. of Germany | 3916658 |
| May 22, 1989 | [JP] | Japan | 3916606 |
| Jun. 14, 1989 | [JP] | Japan | 3919484 |

[51] Int. Cl.$^5$ .................................. G02B 13/18
[52] U.S. Cl. ........................ 359/710; 359/671; 359/714; 359/823
[58] Field of Search ............... 350/432–435, 350/167; 359/708, 710, 714, 823, 623, 671

[56] References Cited

U.S. PATENT DOCUMENTS

| 3,051,051 | 8/1962 | Jeffree | 359/670 X |
| 3,871,748 | 3/1975 | Day | 359/670 |
| 4,555,164 | 11/1985 | Feinbloom | 359/670 |
| 4,826,269 | 5/1989 | Streifer et al. | 350/167 |

FOREIGN PATENT DOCUMENTS 1290738  9/1972  United Kingdom ............. 359/670

Primary Examiner—Scott J. Sugarman
Attorney, Agent, or Firm—Antonelli, Terry Stout & Kraus

[57] ABSTRACT

An optical system for imaging the light from light sources having varying astigmatic differences of focus in different planes, having an optical element with an astigmatic effect and having an imaging lens system, the optical element having an astigmatic effect being provided with two lens components, the distance of which in the direction of the optical axis can be adjusted in order to correct astigmatic differences of focus varying from light source to light source and/or changing astigmatic differences of focus due to aging.

16 Claims, 2 Drawing Sheets

OPTICAL SYSTEM FOR IMAGING THE LIGHT FROM LIGHT SOURCES

TECHNICAL FIELD

The present invention relates to an optical system for imaging the light from light sources having varying angles of emission in different planes and/or the light of which appears to emanate from spaced dot light sources in different planes.

STATE OF THE ART

The light from a series of light sources, including laser diodes, which presently are increasingly gaining in importance, appears to emanate from "dot light sources" in different planes, the dot light sources being spaced in the direction of the optical axis. This space, which is referred to as the astigmatic difference of focus, amounts to several m in the case of laser diodes now commonly used. This astigmatic difference of focus leads to a collimation of the pencil of light, by way of illustration, of laser diodes using conventional collimators, to a "non-dotshaped" image, which is especially troublesome in the case of laser scanners or so-called "light pens". For this reason it is usually necessary to consider correcting the astigmatism.

Furthermore, the laser diodes frequently have different angles of emission in different planes. If one collimates this type of pencil of light with a conventional collimator, one gets a light pencil with a non-circular cross-section. In a number of applications, this deviation from the circular shape is, however, undesirable.

In addition, reference is made to the general survey "Specifying Laser Diode Optics" in *Laser Focus/Electro-Optics*, March 1984, p. 44 ff. Moreover, it is expressly pointed out that this article is to be referred to for the explanation of all terms that have not been made more apparent herein.

In order to correct astigmatism, it is known, by way of illustration from DE-PS 22 66 032 or from the aforementioned general survey, to place a cylindrical lens in the path of the beam, which at least decreases the "astigmatic aberration" for a specific astigmatic difference of focus.

Furthermore, U.S. Pat. No. 3 396 344 proposes placing two cylindrical lenses in the parallel path of the beam after the collimator.

This possible way of correcting astigmatism, however, has not found widespread use. Instead, it has been suggested to correct the astigmatism with laser diodes having two anamorphotic prisms and, if need be, an additional cylindrical lens. Here reference is made to the previously mentioned general article and to Fa. Melles Griot's laser head.

However, astigmatic difference of focus, by way of illustration of laser diodes varies not only from construction type to construction type, but also with a production series due to the production tolerances between different production batches. Moreover, the astigmatic difference of focus changes in the course of conventional period of use of a laser diode due to aging.

Therefore, it is desirable to be able to set the value of the astigmatic correction. This is not possible in the case the state of the art systems or only in such a manner that both emission directions are influenced when setting the astigmatism correction, so that the collimation has to be "readjusted".

From the previously mentioned general survey "Specifying Laser Diode Optics" in *Laser Focus/Electro-Optics*, March 1984, p. 44 ff., it is known to use two anamorphotic prisms to alter the cross-section of the pencil of light. Furthermore, U.S. Pat. No. 3 396 344, also already mentioned, proposes placing two cylindrical lenses in the parallel beam path after the collimator, one cylindrical lens having a short focal length and the other a long focal length. This possible mode of correcting the beam cross-section, however, has not gained wide acceptance.

Instead, in the practical realization thereof, it has been repeatedly attempted to correct the beam cross-section of laser diodes with two anamorphotic prisms. In this connection, reference is made to the laser head of the firm Melles Griot. Laser heads of this type have the drawback that they are comparatively large in construction and weigh a good deal due to the two anamorphotic prisms. Furthermore, it takes very elaborate means of precision mechanics to maintain the angle of the prisms.

SUMMARY OF THE INVENTION

The object of the present invention is to provide an optical system for imaging the light from light sources, which, in particular, may have varying angles of emission in different planes and whose astigmatism correction value for correcting varying astigmatic differences of focus can be set.

Furthermore, an element of the present invention is to provide an optical system for altering the shape of the cross-section of the pencils of light and, in particular, for altering the shape of the cross-section of the laser diodes and whereby the construction of this optical system is short.

An optical system for the event that the astigmatic correction is the primary concern provides that a variable astigmatic correction is attained in accordance with the present invention by providing the optical element having an astigmatic effect with two components having an astigmatic effect, the cylinder axes of these components preferably including an angle unequal 0° and their spacing in the direction of the optical axis can be adjusted in order to correct astigmatic differences of focus varying from light source to light source.

In this way the invented optical system not only permits correcting a specific astigmatic difference of focus, but permits correcting astigmatic differences of focus in a specific range as usually occur in the case of laser diodes of the same type of construction but not from the same production batch. Moreover, the invented optical system permits "adjusting" the correction of the astigmatic difference of focus when aging becomes evident and the astigmatic differences of focus change as a consequence.

Solutions are also provided for the event that shaping the cross-section of the beam is the primary concern.

A change in the shape of the cross-section of the beam is attained in accordance with the present invention by being based on an optical system for altering the shape of the cross-section of light pencils and, in particular, for altering the cross-section of laser diodes, whereby this optical system has at least two components with cylindrical refractive power, as is known from U.S. Pat. No. 3 396 344, or by being based on a system as described above.

An element of the present invention is that this system is further improved by means of a combination of the following features:

the cylinder axes of the components having cylindrical refractive power include an angle $\alpha$, for which:

$$-20° \leq \alpha \leq 20°$$

holds true, the components having cylindrical refractive power form an afocal system in the two main sections while taking the astigmatism of the pencil of light into consideration, for the focal lengths $f_1$, respectively $f_2$ of the main sections, which should contribute to a change in shape, if in this main section the beam is to be widened: $1 \text{ mm} < |f_1| < 300 \text{ mm}$
compressed: $1 \text{ mm} < |f_2| < 300 \text{ mm}$ holds true, with subscript 1 designating the first component having cylindrical refractive power in the direction of the pencil of light and subscript 2 the second element.

Another possible way of shaping the cross-section of the beam is described for the case that the basis is an optical system for altering the shape of the cross-section of pencils of light and, in particular, for altering the shape of the cross-section of laser diodes, whereby this system has at least two components and this system can be further improved by at least one of the elements being provided with two cylindrical surfaces, the cylinder axes of which include an angle $\alpha$, for which $$-20° \leq \alpha \leq 20°$$

holds true, and that for the focal lengths $f_1$, respectively $f_2$ of the main sections, which are to contribute to a change in shape, if in this main section the beam is to be widened: $1 \text{ mm} < |f_1| < 300 \text{ mm}$
compressed: $1 \text{ mm} < |f_2| < 300 \text{ mm}$ holds true, with subscript 1 designating the first component having cylindrical refractive power in the direction of the light pencil and subscript 2 the second element.

By means of the invented placing of (at least) two cylindrical surfaces of short focal length having refractive power in the same main section, respectively main sections, which are staggered by the above-mentioned angle range, the desired shaping of the cross-section of the beam while having a short type of construction can be attained. In this event the embodiment, in which at least one component is provided with two cylindrical surfaces, is of particular interest as in this event no excessively "curved" radii are required. Furthermore, the embodiment has an additional degree of freedom for correcting due to which wave front aberrations can be kept at values lower than $2^2/500$.

The invented embodiment, by way of illustration, permits transforming an elliptic beam cross-section into a circular one. Naturally, however, circular or elliptical beam cross-sections can be transformed into other elliptically shaped cross-sections.

In any event, the invented system has the advantage that it can cope with different size apertures without any shift of axis in the two main directions.

Moreover, the invented basic construction can be easily adapted to changing of the shape of the beam cross-section.

As explained above, in the case of laser diodes, in addition to the difference in emission angles, there is also the problem that pencils of light in planes, which are perpendicular to one another, come from "dot light sources", which are spaced in the direction of the optical axis, this space being several m in presently conventional laser diodes. For this reason, it is usually necessary to provide a correction of the astigmatism in addition to shaping the cross-section of the beam. For this purpose, the components having an astigmatic effect provided in accordance with the present invention can be utilized in the systems described above. It is particularly preferable if at least one of the components having an astigmatic effect can be shifted in the longitudinal direction of the optical axis.

A preferred focal length range for the systems described is given, according to which $6 \text{ mm} < |f_1| < 50 \text{ mm}$ in the case of widening
$6 \text{ mm} < |f_2| < 50 \text{ mm}$ in the case of compressing the beam holds true.

In principle, any component, by way of illustration cement elements or an optical component composed of several lenses, may be utilized as components having an astigmatic, respectively a cylindrical, effect.

Due to the invented optical design, however, a good corrective effect is already attained with simple cylindrical lenses.

In the case of a system, in which the foremost concern is the astigmatism, the cylinder axes of the cylindrical lenses preferably include an angle of 90°.

If cylindrical lenses are utilized, the surface without a cylindrical effect may, of course, be designed as a normal spherical or aspherical surface. It is, however, preferable if this surface is a plane surface in as far as it is not also a cylindrical surface. This improvement has the advantage, in particular, if with the "cylindrical surface" the main section has a radius of "$\infty$" and therefore this main section has no effect, that the "spherical" effect of both astigmatic components is zero. Thus "interference" with the correction of the overall system through shifting and or rotating one or both cylindrical components may be ignored in practice.

According to a feature of the present invention, the cylindrical surfaces are the surfaces of both cylindrical lenses facing each other. Also designing both cylindrical surfaces in the same manner, yields, the 90° angle being between both axes, a system having practically no astigmatic effect when the two cylindrical lenses are shifted close together. It is only by increasing the space that a cylindrical effect, respectively an astigmatism comes about in the overall system, which compensates for the astigmatism generated by the laser diodes.

In this manner, the arrangement has the advantage that even very small astigmatic values can be compensated as very small spaces between the cylindrical lenses also create very small astigmatic sections.

If, however, such small astigmatic values were to be compensated by only one cylindrical lens, it would have to have very large radii, which can only be fabricated and measured with great difficulty.

On the other hand, selecting varying cylinder-lens radii has the advantage that astigmatic values can be compensated, which are symmetrical to any mean value. If, by way of illustration, the type of laser diode to be used has a mean astigmatism of 0.03 mm and the typical fluctuations of the astigmatism are in the range ±0.01 mm, the compensation can be set exactly for this range by means of a suited selection of the cylindrical surface, with the shift path being "prescribed".

Naturally, the plane adjacent to the light source and/or to the optical system arranged after it can, however, also be designed as a cylindrical surface.

With a suited selection of the radii, furthermore, the astigmatic values can be compensated via zero from negative values to positive values.

At this time it is expressly pointed out that by means of the suited selection of the radii of both cylindrical lenses, the precision of the astigmatism compensation can be controlled, by way of illustration with a prescribed shift range of a component. "Flat", i.e. large radii, yield relatively great positioning imprecision, on the other hand the selection of smaller radii permits compensation in a larger range of astigmatism, however, in this event positioning accuracy has to be greater. Thus, by way of illustration, the system can be laid out in such a manner that with aging an astigmatism adjustment of the light source can occur "so to say on the spot" by shifting one or several lenses by means of a manipulator or "manually".

The improvement of the present invention has the advantage that by means of a suited selection of the cylindrical surfaces, which by way of illustration may have "crossed cylinders", the, under circumstances, required "weak cylindrical effects" can also be obtained with easily produced radii.

Furthermore, a fine setting of the astigmatism correction can also occur by means of an additional rotation of one or both components having an astigmatic effect. This, in particular, permits a correction when the light source has an "irregular" axis of astigmatism. In this way, production tolerances can be individually compensated in lenses having two cylindrical surfaces.

In this case, the procedure can be one wherein the rotatable lens component or components are cemented following the individual correction.

The invented optical system may, naturally, be designed in such a manner that one or both lens components having an astigmatic effect can be adjusted to correct aging characteristics by utilizing a manipulator component, which by way of illustration is arranged on the exterior of the mounting, the lens components being alignable during operation, by way of illustration a light pen's. In the case of light sources, on which aging characteristics have little influence, however the "individual" astigmatism (by way of illustration) of the laser diode built into an optical system can be corrected by appropriate shifting and, if need be, rotation of one or both lens components during the production of this optical system and subsequently the lens component or components can be fixed in the casing by means of an adhesive, by way of illustration a UV-hardening adhesive system.

The invented optical system may be arranged, between the light source and the collimator or, after the collimator. Naturally, however the invented optical system may also be utilized in a system with a finite imaging scale or the components having an astigmatic effect may also be given a collimator function.

In addition, the components having an astigmatic effect may be integrated in the imaging-lens system, in the case of imaging with a finite imaging scale, or in the collimator, in the event of imaging "infinitely". In this case, the other surfaces of the cylindrical lenses may, in particular, have a spherical effect, thus are not plane surfaces, so that they contribute to the optical effect of the entire system.

BRIEF DESCRIPTION OF THE DRAWINGS

The present invention is made more apparent in the following section using a preferred embodiment with reference t the accompanying drawing, in which.

DESCRIPTION OF THE PREFERRED EMBODIMENT

Figure 1:
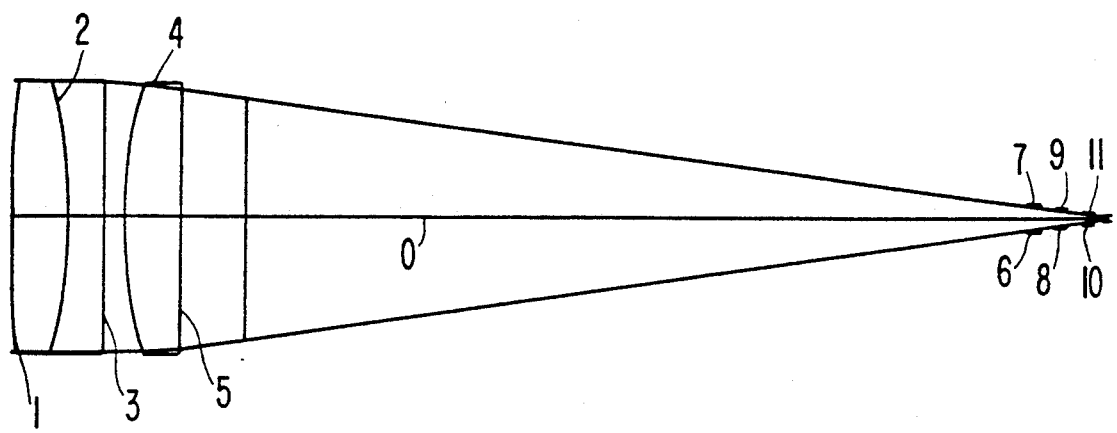
FIG. 1 depicts a lens section through an invented optical system for correcting astigmatism.

FIG. 1 shows a lens section through an invented optical system, which is provided with a collimator lens (surface 1 to 5) of conventional design and two cylindrical lenses (surface 6 and 7, respectively 8 and 9). Surfaces 10 and 11 belong to a plane parallel plate, which by way of illustration can serve as a filter, etc. 12 and 13 designate the glass cover of the laser diode and 14 the emitting surface of the laser diode.

Figure 2:
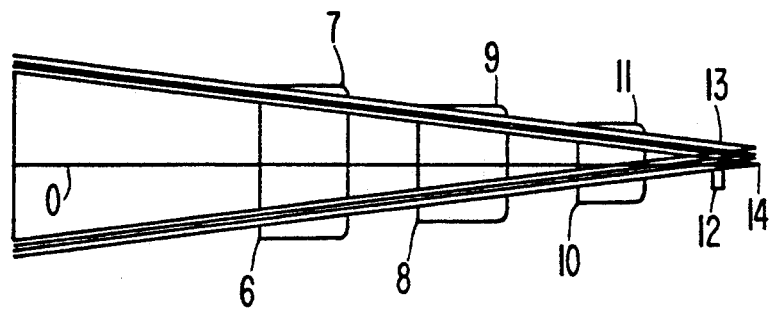
FIG. 2, depicts enlarged a part of the system according to FIG. 1.

FIG. 2 depicts enlarged surfaces 6 to 14 of the system illustrated in FIG. 1.

In the illustrated preferred embodiment, the cylindrical lenses have a "plane effect" in one section of the cylindrical surface, i.e. one radius of the cylindrical lens is infinite. The other radius is selected according to the astigmatic value to be corrected and may be typically varied between 600 mm and 5000 mm in the illustrated preferred embodiment in order to obtain different compensation ranges. Furthermore, the other surface of the two cylindrical lenses, i.e. the surface without a cylindrical effect, is a plane surface. For this reason, the radii of curvature of the cylindrical lenses are indicated with "∞" in the following tables.

In the illustrated preferred embodiment, the cylindrical lens formed by surfaces 6 and 7 can be shifted in the direction of the optical axis 0, whereas the second cylindrical lens (formed by surfaces 8 and 9) is arranged in a stationary manner.

The aspect that "flat" radii are more difficult to fabricate than "more curved" radii dictates the selection of the cylindrical surface:

If relatively small astigmatic values are to be corrected, it is preferable to select surfaces 7 and 8, which face each other, as cylindrical surfaces as in this case the overall system has an astigmatism near zero when the two cylinder lenses are pushed almost completely together.

On the other hand, surfaces 6 and/or 9 will be selected as cylindrical surfaces if comparatively large astigmatic values are to be corrected.

The following table gives, by way of example, numerical values for a preferred embodiment without the intention of limiting the spirit and scope of the overall invention.

Herein Ri designates the radius of curvature of surface i (in mm), di the apex distance of the surfaces (i+1) and i (in mm) and ni, respectively vi, the refractive index and Abbe number of the material between surfaces i and (i+1) for line d. (ni=1 means an air space.)

In the illustrated preferred embodiment, surfaces 7 and 8 are cylindrical surfaces. In one main section, these surfaces have the radius ∞, in another main section the radius may vary between approximately 600 mm and 5000 mm depending on the light source utilized. The selected radius depends on the astigmatism to be compensated, on the shift path in the divergent beam path, which is determined by the available peripheral diameter of the cylinder axes and on the desired positioning tolerance and on the fabrication possibilities. An expert versed in the art is able at any time to select an appropriate radius.

Normally, the cylinder axes are perpendicular to each other in the illustrated preferred embodiment. If need be, however, an additional possible rotation of the cylinder axes about the optical axis 0 may be provided. The individual radii of the cylindrical lenses may also be selected in such a manner that, in addition, a correction of the cross-section of the beam from elliptical to circular occurs as is the case in the second preferred embodiment of the present invention.

TABLE

| | | | |
|---|---|---|---|
| R1 = 246.7 | d1 = 9.0 | n1 = 1.59 | v1 = 61 |
| R2 = −126.8 | d2 = 6.0 | n2 = 1.78 | v2 = 26 |
| R3 = −617.5 | d3 = 3.5 | n3 = 1 | |
| R4 = 105.54 | d4 = 9.0 | n4 = 1.59 | v4 = 61 |
| R5 = 464.7 | d5 = 134.6 | n5 = 1 | |
| R6 = ∞ | d6 = 2.6 | n6 = 1.52 | v6 = 64 |
| R7 = ∞ | d7 = 2.0 | n7 = 1 | |
| R8 = ∞ | d8 = 2.6 | n8 = 1.52 | v8 = 64 |
| R9 = ∞ | d9 = 2.0 | n9 = 1 | |
| R10 = ∞ | d10 = 2.0 | n19 = 1.52 | v10 = 64 |
| R11 = ∞ | d11 = 2.0 | n11 = 1 | |
| R12 = ∞ | d12 = 0.25 | n12 = 1.49 | v12 = 70 |
| R13 = ∞ | | | |

Figure 3:
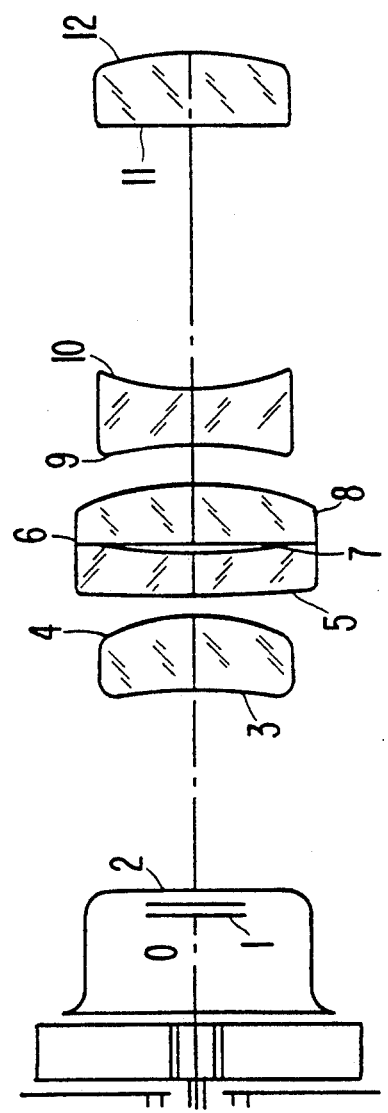
FIG. 3 depicts a lens section through an invented optical system for shaping the beam.

FIG. 3 shows a lens section through an invented optical system for shaping the beam having a laser diode L with a glass cover (surfaces 1 and 2) and a collimator lens of conventional design (surface 3 to 8) including two cylindrical lenses (surface 9 and 10, respectively 11 and 12) In the illustrated preferred embodiment, one cylindrical lens (surfaces 9 and 10) has two cylindrical surfaces and the other cylindrical lens (surfaces 11 and 12) a cylindrical surface (12) and a plane surface (11). All the cylindrical surfaces have a "plane effect" in one section, i.e. one radius of the cylindrical lens is infinite. Therefore, only the other section is given in the table. In this case the angle is $\alpha=0°$. In order to correct fabrication errors, in particular of the cylindrical lens having two astigmatic surfaces, the two lenses may be rotated "several degrees" counter to each other.

The following table gives, by way of example, numerical values for a preferred embodiment without the intention of limiting the scope and nature of the overall invention. Herein Ri designates the radius of curvature of surface i (in mm), di the apex distance of the surfaces (i+1) and i (in mm) and ni, respectively vi, the refractive index and Abbe number of the material between surfaces i and (i+1) for line d. (ni=1 means an air space.) The focal length is normed to 10 mm, the actual focal length is approximately 9 mm.

TABLE

| Light-generating surface d0 = 2.0 | | | |
|---|---|---|---|
| R1 = ∞ | d1 = 0.3 | n1 = 1.51 | v1 = 60.4 |
| R2 = ∞ | d2 = 4.8 | n2 = 1 | |
| R3 = −19.61 | d3 = 2.2 | n3 = 1.66 | v3 = 35.8 |
| R4 = −6.98 | d4 = 0.6 | n4 = 1 | |
| R5 = 55.08 | d5 = 1.3 | n5 = 1.65 | v5 = 33.9 |
| R6 = 18.85 | d6 = 0.3 | n6 = 1 | |
| R7 = 428.15 | d7 = 1.8 | n7 = 1.69 | v7 = 54.7 |
| R8 = −11.07 | d8 = 1.1 | n8 = 1 | |
| R9 = −15.14 | d9 = 1.7 | n9 = 1.78 | v9 = 26.1 |
| R10 = 9.12 | d10 = 7.8 | n10 = 1 | |
| R11 = ∞ | d11 = 2.2 | n11 1.69 | v11 = 54.7 |

TABLE-continued

| Light-generating surface d0 = 2.0 | |
|---|---|
| R12 = −11.35 | |

The present invention has been described in the preceding section without the intention of limiting the scope and nature of the overall invention.

What is claimed is:

1. An optical system for imaging the light from light sources having varying astigmatic difference of focus in different planes, having an optical element component with an astigmatic effect and having an imaging lens system, wherein the optical element component having an astigmatic effect is provided with at least two lens elements, the distance of which in the direction of the optical axis can be adjusted in order to correct at least one of astigmatic differences of focus varying from light source to light source and changing astigmatic differences of focus due to aging.

2. An optical system according to claim 1, wherein the cylinder axes of said lens elements include a 90° angle.

3. An optical system for imaging light from light sources having varying emission angles in different planes and having the at least two lens elements having cylindrical astigmatic refractive power according to claim 1, wherein for altering a shape of the cross-section of a beam of light pencils and for altering a shape of the cross-section of a beam of laser diodes;

cylinder axes of said elements having cylindrical refractive power include an angle $\alpha$, for which $-20° \leq \alpha \leq 20°$ holds true, said lens elements having cylindrical refractive power form an a focal system in both main sections while taking the astigmatism of the light pencil into account, for the focal lengths $f_1$, respectively $f_2$ of the main sections, which are to contribute to a change in shape if the beam in said main section is to be widened: $1 \text{ mm} < |f_1| < 300 \text{ mm}$, respectively compressed: $1 \text{ mm} < |f_2| < 300 \text{ mm}$ holds true, with subscript 1 designating the first lens element having cylindrical refractive power in the direction of said light pencil and subscript 2 the second one.

4. An optical system for imaging light from light sources having varying emission angles in different planes and having at least one lens element having cylindrical astigmatic refractive power according to claim 1, wherein, in order to alter a shape of the cross-section of a beam of light pencils, and in order to alter a shape of the cross-section of a beam of laser diodes, the at least one lens element is provided with two cylindrical surfaces, the cylinder axes of which include an angle $\alpha$, for which:

$-20° \leq \alpha \leq 20°$ holds true, and that for focal lengths $f_1$ and $f_2$ and of main sections which are to contribute to a change in shape if said main section of the beam is to be widened: $1 \text{ mm} < |f_1| < 300 \text{ mm}$, respectively compressed: $1 \text{ mm} < |f_2| < 300 \text{ mm}$, holds true, with subscript 1 designating a first lens element having cylindrical refractive power in the direction of said light pencil and subscript 2 a second one.

5. A system according to claim 3 or 4, wherein
6 mm < $|f_1|$ < 50 mm in the case of widening, respectively
6 mm < $|f_2|$ < 50 mm in the case of compressing
the beam holds true.

6. A system according to one of the claims 1 to 4, wherein cylinder axes of both said lens elements having an astigmatic effect include a 0° angle.

7. A system according to claims 1 to 4, wherein said lens elements having a cylindrical astigmatic effect are cylindrical lenses having cylindrical surfaces.

8. A system according to claim 7, wherein said cylindrical surfaces are surfaces facing each other of both said cylindrical lenses.

9. A system according to claim 7, wherein both said cylindrical surfaces are the same in design.

10. A system according to claim 7, wherein the other surface of said cylindrical lens is a plane surface.

11. A system according to one of the claims 1 to 4, wherein at least one of said lens components having an astigmatic effect can be rotated about the optical axis.

12. A system according to claim 11, wherein that said rotatable lens component or components is a cemented lens element following the correction of the individual cross-section of the beam.

13. A system according to one of the claims 1 to 4, wherein said lens elements having an astigmatic effect have a zero effect in one main section.

14. A system according to one of the claims 1 to 4, wherein at least one of said lens elements having an astigmatic effect has two cylindrical surfaces.

15. A system according to one of the claims 1 to 4, wherein the optical element component having an astigmatic effect is arranged between said light source and said collimator.

16. A system according to one of the claims 1 to 4, characterized by the fact that said optical element component having an astigmatic effect is arranged after a collimator.

* * * * *